US009052963B2

(12) United States Patent
Chang et al.

(10) Patent No.: US 9,052,963 B2
(45) Date of Patent: Jun. 9, 2015

(54) CLOUD COMPUTING DATA CENTER MACHINE MONITOR AND CONTROL

(75) Inventors: David Y. Chang, Austin, TX (US); John Y Chang, Austin, TX (US); Edwin M Philpot, Jr., Cedar Park, TX (US); Vishwanath Venkataramappa, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 166 days.

(21) Appl. No.: 13/476,795

(22) Filed: May 21, 2012

(65) Prior Publication Data

US 2013/0311632 A1    Nov. 21, 2013

(51) Int. Cl.
*G06F 15/173* (2006.01)
*G06F 9/50* (2006.01)
*G06F 11/30* (2006.01)
*G06F 11/34* (2006.01)

(52) U.S. Cl.
CPC .......... *G06F 9/5072* (2013.01); *G06F 11/3003* (2013.01); *G06F 11/3058* (2013.01); *G06F 11/3409* (2013.01); *G06F 2201/815* (2013.01)

(58) Field of Classification Search
CPC ..................................... H04L 41/08
USPC ................................. 709/230, 232
See application file for complete search history.

(56) References Cited

U.S. PATENT DOCUMENTS

| 2009/0137414 | A1  | 5/2009  | Drmanac et al. |         |
|--------------|-----|---------|----------------|---------|
| 2009/0193414 | A1* | 7/2009  | Broussard et al. | 718/1 |
| 2010/0082351 | A1  | 4/2010  | Lee |         |
| 2010/0287280 | A1  | 11/2010 | Sivan |         |
| 2011/0022694 | A1  | 1/2011  | Dalal et al. |         |
| 2011/0022695 | A1* | 1/2011  | Dalal et al. | 709/222 |
| 2011/0055539 | A1  | 3/2011  | Sasaki et al. |         |
| 2011/0075674 | A1* | 3/2011  | Li et al. | 370/401 |
| 2011/0110377 | A1  | 5/2011  | Alkhatib et al. |         |
| 2011/0121499 | A1  | 5/2011  | Zhang et al. |         |
| 2011/0126197 | A1  | 5/2011  | Larsen et al. |         |
| 2012/0005344 | A1* | 1/2012  | Kolin et al. | 709/226 |
| 2013/0031544 | A1* | 1/2013  | Sridharan et al. | 718/1 |
| 2013/0290953 | A1* | 10/2013 | Li et al. | 718/1 |

FOREIGN PATENT DOCUMENTS

WO    2011014830    2/2011

OTHER PUBLICATIONS

"Supporting migration of Virtual machines running Multi-tier applications in Computing clouds that span multiple IP address ranges", IPCOM000198971D www.IP.com Aug. 19, 2010, 7 pages.
IBM, "Method of creating a componentized architecture for unifying resource sharing scenarios in Cloud Computing environment", IPCOM000193146D www.IP.com Feb. 11, 2010, 14 pages.

* cited by examiner

*Primary Examiner* — Wing F Chan
*Assistant Examiner* — Andrew Woo
(74) *Attorney, Agent, or Firm* — DeLizio Law, PLLC

(57) ABSTRACT

Systems, methods and computer-readable media provide for identifying a physical machine corresponding to a virtual machine. A system assigns a data center machine identifier to a physical computing device in a data center, along with a physical location for the physical computing system. In response to creating a virtual machine on the physical computing device, the system creates a mapping from a virtual machine identifier for the virtual machine to the data center machine identifier for the physical computing system.

17 Claims, 5 Drawing Sheets

CLOUD COMPUTING DATA CENTER MACHINE MONITOR AND CONTROL

BACKGROUND

Embodiments of the inventive subject matter generally relate to the field of networks of computing systems and, more particularly, to monitoring and controlling machines in a data center.

Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large data centers house the machines used to deliver the services provided by the cloud. A typical cloud computing data center may have a machine grid with a large number of blade machines that can be of different brands and types. Further, virtual machines may be configured on the physical machines in the data center. In the virtualized environment, a client typically deals with virtual images and is not concerned with the physical machine where the virtual image is running. However, when a problem or event arises, it can be desirable to determine whether the root cause of the problem is related to the physical machine or the virtual machine image. A problem arises in that it can be very difficult locate the physical machine associated with a virtual machine in a lame scale grid of physical machines in a data center.

SUMMARY

Systems, methods and computer-readable media provide for identifying a physical machine corresponding to a virtual machine. A system assigns a data center machine identifier to a physical computing device in a data center, along with a physical location for the physical computing system. In response to creating a virtual machine on the physical computing device, the system creates a mapping from a virtual machine identifier for the virtual machine to the data center machine identifier for the physical computing system.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes example systems, methods, techniques, instruction sequences and computer program products that embody techniques of the present inventive subject matter. However, it is understood that the described embodiments may be practiced without these specific details. For instance, although examples refer to data centers and cloud environments, the inventive subject matter described herein may be applied to any large group of computing systems. In other instances, well-known instruction instances, protocols, structures and techniques have not been shown in detail in order not to obfuscate the description.

In general, the inventive subject matter relates to controlling and monitoring computing systems in a data center environment. The systems and methods described herein provide a means to quickly locate a physical computing system hosting a virtual machine. Thus if problems or events occur on the virtual machine, a technician can rapidly locate the physical computing system associated with the virtual machine experiencing the problem or event.

Figure 1:
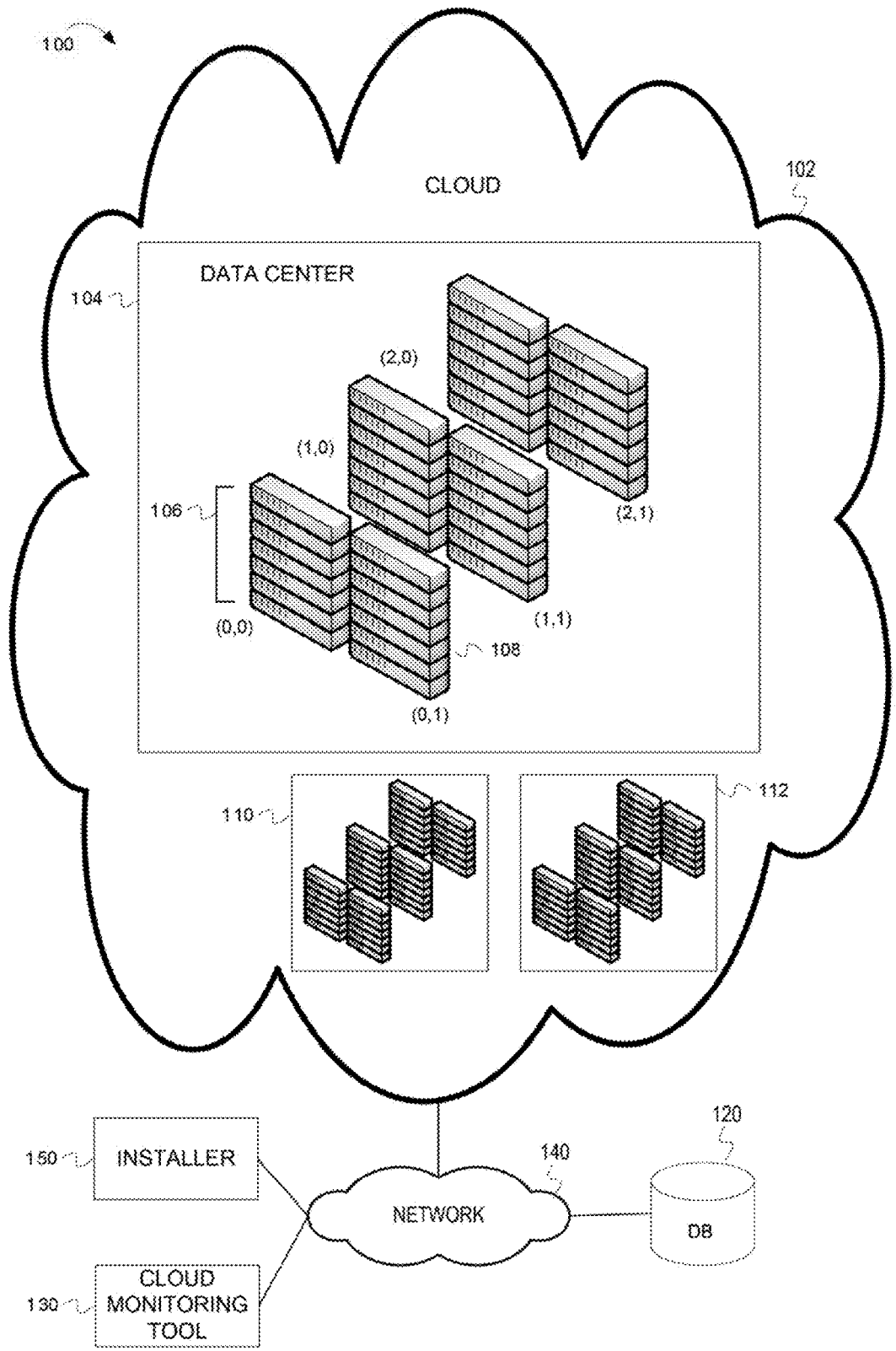
FIG. 1 is a block diagram illustrating various major components of a system according to embodiments.

FIG. 1 is a block diagram illustrating various major components of a system 100 according to embodiments. In some embodiments, system 100 includes a cloud computing environment 102 that includes one or more data centers 104, a cloud monitoring tool 130 and a database 120. Network 140 may communicably couple various components of system 100. Network 140 may be a private network or it may be a public network, including the Internet. Although three data centers 104 are shown in FIG. 1, those of skill in the art will appreciate that a cloud 102 may have fewer or more than three data centers 104.

In general, a data center 104 comprises one or more facilities that house multiple computing systems and the power supplies, network equipment, and environment controls necessary to operate the computing systems. The multiple computing systems may be organized in various manners. For example, in some embodiments, the multiple computing systems in the data center may be placed in racks 106. The racks in data center 102 can be organized into a grid, with the racks in the grid assigned a coordinate in the grid to identify the rack's location in the grid. FIG. 1 illustrates an example 2×3 grid of racks, with the rack at the lower left being assigned the grid coordinate (0,0) and the rack at the upper right being assigned grid coordinate (2,1). Those of skill in the art will appreciate that other grid configurations are possible and within the scope of the inventive subject matter. A data center will typically have hundreds of even thousands of computing system distributed through many racks.

As will be appreciated by those of skill in the art having the benefit of the disclosure, the grid coordinates illustrated in FIG. 1 provide a two dimensional position for a rack. The position of a computing system within a rack may provide a third dimension. For example, computing system 108 occupies the third position within the rack at grid location (0,1). Computing system 108 may thus be assigned a three dimensional grid location of (0,1,2).

Other methods of locating racks and computing nodes within a data center can be used in addition to, or instead of a grid coordinate. For example, in some embodiments, system 100 may assign a GPS (Global Positioning System) coordinate to racks or computing systems within data center 104.

Database 120 may be any type of database now known or developed in the future. In some embodiments, database 120 is a relational database. Database 120 may maintain various attributes regarding computing systems present in a data center 104. Examples of such attributes include the manufacture brand, machine model, machine serial number, data center machine ID, data center grid location, internet address, RFID, or other attributes. A configuration tool may initialize these attributes when a computing system is installed at a data center 104.

Installer 150 comprises installation software that executes when a computing system is installed in a data center 104.

Installer 150 may be part of a process that installs and configures operating system and application software on a computing system that is newly added or moved to data center 104. Installer 150 updates database 120 with attributes of the machine being installed.

Cloud monitoring tool 130 monitors the status of computing systems within the one or more data centers 104 in cloud 102. In addition, cloud monitoring tool 130 may provide control and configuration functions with respect to the computing systems in cloud 102. Cloud monitoring tool 130 uses or stores data in database 120. Further details on the operation of cloud monitoring tool 130 are provided below with respect to FIG. 2.

Figure 2:
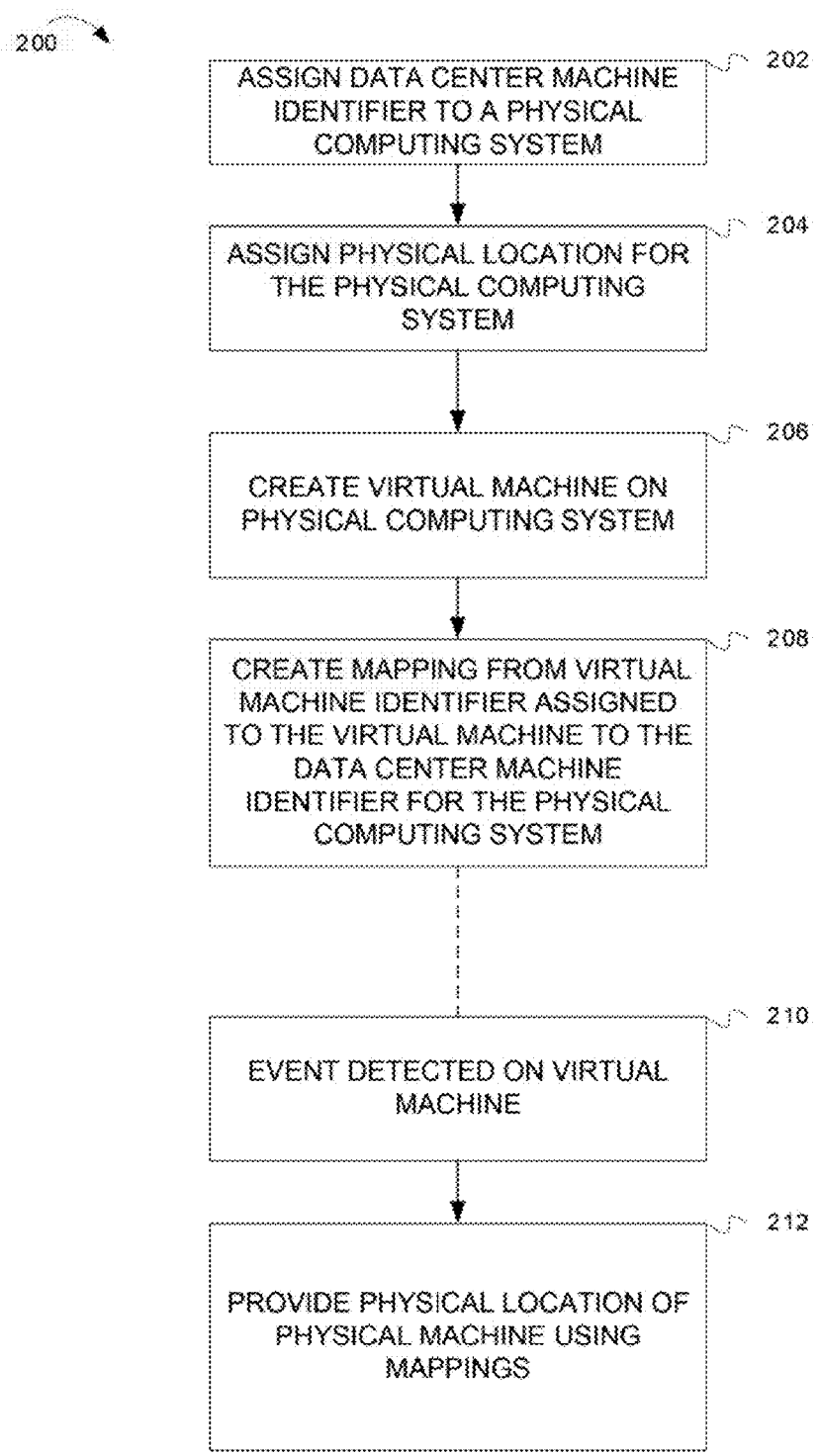
FIG. 2 is a flowchart illustrating a method for monitoring and controlling computers in a data center environment according to embodiments.

FIG. 2 is a flowchart illustrating a method 200 for monitoring and controlling computers in a data center environment according to embodiments. Method 200 begins at block 202 with assigning a data center machine identifier to a physical computing system in a data center. In some embodiments, installer 150 assigns the data center machine identifier using data available from the machine being installed and from database 120. Additionally, installer 150 may prompt a user to provide any information that is not available from the machine begin installed or database 120. The data center machine identifier uniquely identifies a computing system within a cloud. In some embodiments, the data center machine identifier comprises a manufacture brand, machine model and machine serial number. Those of skill in the art having the benefit of the disclosure will appreciate that other attributes could be used to form a data center machine identifier. The data center machine ID may be used as a machine primary key in database 120. Once assigned, the computing system associated with the data center machine identifier may be physically labeled with the identifier, for example using a bar code or RFID tag.

At block 204, installer 150 assigns a physical location for the computing system. As noted above, the physical location may comprise a three dimensional grid location that includes a row, column and vertical address (rack slot) for the computing system. Alternatively, the physical location may be a GPS based location. In some embodiments, a handheld device can be used to scan the bar code having the data center machine identifier. The handheld device can then automatically associate in database 120 a grid location or GPS location with the data center machine identifier. In some embodiments, the physical location may be assigned as a system property of the operating system running on the computing system.

At block 206, a virtual machine is created on a computing system in data center 104. A system configuration tool may be used to configure and create a virtual machine on a physical computing system.

At block 208, installer 150 creates a mapping that maps an identifier for the virtual machine with a data center machine identifier. For example, when the virtual machine is started, the virtual machine registers its internet address in database 120. The registration process on the virtual machine obtains the data center machine identifier for the physical machine hosting the virtual machine and associates, in database 120, the internet address with the data center machine identifier. Similarly, the virtual machine can deregister its internet address when the virtual machine is shut down.

At block 210, an event is detected on a virtual machine. The event may be a hardware event occurring on the underlying physical computing system hosting the virtual machine, a software event, or a combination of the two. As an example, the event may be a performance bottleneck on the virtual machine.

Upon detection of an event, at block 212, cloud monitoring tool 130 utilizes the mapping created at block 208 to obtain the physical location of the computing system hosting the virtual machine and provides the from database 120. For example, cloud monitoring tool 130 may use the internee address of the virtual machine experiencing the event to look up the data center machine identifier, which is then used to look up the physical location of the computing system hosting the virtual machine. Cloud monitoring tool 13 may provide the physical address to a user so that the user can then locate the physical machine hosting the virtual machine. The physical location may be provided as a grid location or GPS location of the computing system experiencing the event. Additionally, the location data may be used to generate a map that highlights the location of the computing system in the data center.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, infrared, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable, medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services)that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3:
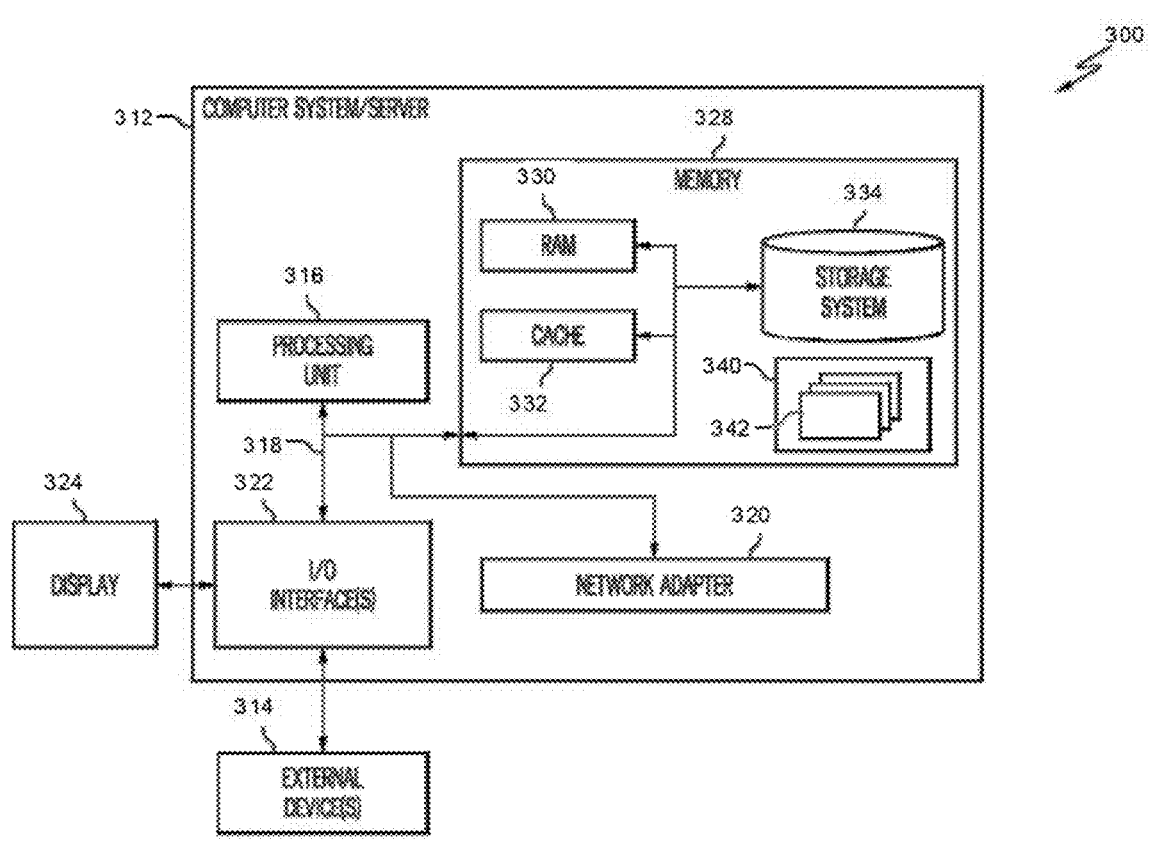
FIG. 3 is a schematic of an example of a cloud computing node.

Referring now to FIG. 3, a schematic of an example of a cloud computing node is shown. Cloud computing node 310 is only one example of a suitable cloud computing node and is not intended to suggest any limitation as to the scope of use or functionality of embodiments of the invention described herein. Regardless, cloud computing node 310 is capable of being implemented and/or performing any of the functionality set forth hereinabove.

In cloud computing node 310 there is a computer system/server 312, which is operational with numerous other general purpose or special purpose computing system environments or configurations. Examples of well-known computing systems, environments, and/or configurations that may be suitable for use with computer system/server 312 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 312 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 312 in cloud computing node 310 is shown in the form of a general-purpose computing device. The components of computer system/server 312 may include, but are not limited to, one or more processors or processing units 316, a system memory 328, and a bus 318 that couples various system components including system memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 312 typically includes a variety of computer system readable media. Such media may be any available media that is accessible by computer system/server 312, and it includes both volatile and non-volatile media, removable and non-removable media.

System memory 328 can include computer system readable media in the form of volatile memory, such as random access memory (RAM) 330 and/or cache memory 332. Computer system/server 312 may further include other removable/non-removable, volatile/non-volatile computer system storage media. By way of example only, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein.

Computer system/server 312 may also communicate with one or more external devices 314 such as a keyboard, a pointing device, a display 324, etc.; one or more devices that enable a user to interact with computer system/server 312; and/or any devices (e.g., network card, modem, etc.) that enable computer system/server 312 to communicate with one or more other computing devices. Such communication can occur via Input/Output (I/O) interfaces 322. Still yet, computer system/server 312 can communicate with one or more networks such as a local area network (LAN), a general wide area network (WAN), and/or a public network (e.g., the Internet) via network adapter 320. As depicted, network adapter 320 communicates with the other components of computer system/server 312 via bus 318. It should be understood that although not shown, other hardware and/or software components could be used in conjunction with computer system/server 312. Examples, include, but are not limited to: microcode, device drivers, redundant processing units, external disk drive arrays, RAID systems, tape drives, and data archival storage systems, etc.

Figure 4:
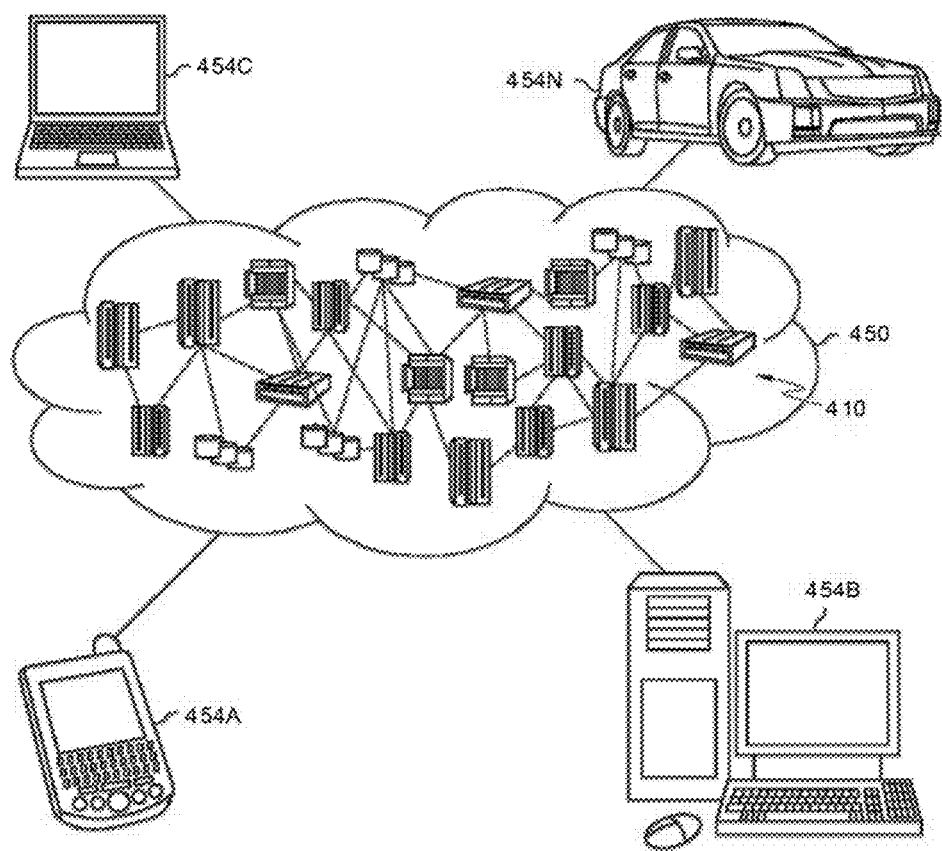
FIG. 4 depicts an example cloud computing environment.

Referring now to FIG. 4, illustrative cloud computing environment 450 is depicted. As shown, cloud computing environment 450 comprises one or more cloud computing nodes 10 with which local computing devices used by cloud consumers, such as, for example, personal digital assistant (PDA) or cellular telephone 454A, desktop computer 454B, laptop computer 454C, and/or automobile computer system 454N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454A-N shown in FIG. 45 are intended to be illustrative only and that computing nodes 10 and cloud computing environment 450 can communicate with any type of computerized device over any type of network and/or network addressable connection (e.g., using a web browser).

Figure 5:
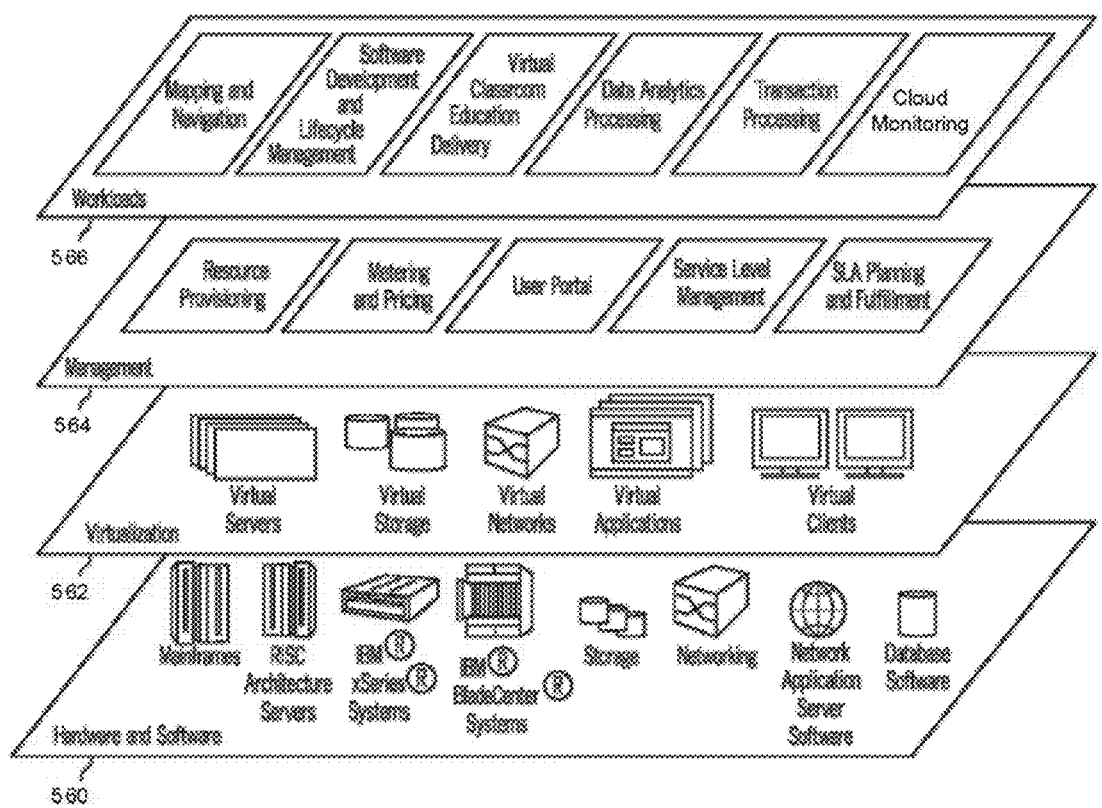
FIG. 5 is a block diagram illustrating a set of functional abstraction layers provided by an example cloud computing environment.

Referring now to FIG. 5, a set of functional abstraction layers provided by example cloud computing environment 450 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 560 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 562 provides an abstraction layer from which the following examples of virtual entities may be provided: virtual servers; virtual storage; virtual networks, including virtual private networks; virtual applications and operating systems; and virtual clients.

In one example, management layer 564 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 566 provides examples of functionality for which the cloud computing environment may be utilized. Examples of workloads and functions which may be provided from this layer include: mapping and navigation; software development and lifecycle management; virtual classroom education delivery; data analytics processing; transaction processing; and supporting a monitored asset.

While the embodiments are described with reference to various implementations and exploitations, it will be understood that these embodiments are illustrative and that the scope of the inventive subject matter is not limited to them. In general, techniques for providing a physical location for a computing system hosting a virtual machine as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A computer implemented method for identifying a physical machine corresponding to a virtual machine, the method comprising:
    assigning, in a database, a data center machine identifier to a physical computing system in a data center;
    assigning, in the database, a physical location within the data center for the physical computing system;
    in response to creating a virtual machine on the physical computing system, creating a mapping from a virtual machine identifier assigned to the virtual machine to the data center machine identifier for the physical computing system, wherein creating the mapping includes mapping an internet protocol address for the virtual machine to the physical computing system;
    in response to an occurrence of an event on the virtual machine, using the mapping to determine the physical location for the physical computing system associated with the virtual machine based, at least in part, on the data center machine identifier of the physical computing system in the data center;
    displaying a map of at least a portion of the data center; and
    identifying on the map the physical location for the physical computing system associated with the virtual machine.

2. The method of claim 1, wherein assigning, in the database, the data center machine identifier includes receiving one or more of a manufacturer brand, machine model, or machine serial number for the physical computing system.

3. The method of claim 1, wherein assigning, in the database, the physical location within the data center for the physical computing system includes assigning one or more of a column, a row, or a vertical address of the physical computing system in the data center.

4. The method of claim 3, wherein assigning, in the database, the physical location within the data center for the physical computing system includes assigning a location within a rack of physical computing systems.

5. The method of claim 1, wherein creating the mapping includes:
    obtaining, by the virtual machine, the data center machine identifier for the physical computing system hosting the virtual machine; and
    associating in the database, by the virtual machine, the internet protocol address for the virtual machine with the data center machine identifier for the physical computing system hosting the virtual machine.

6. The method of claim 1, wherein identifying on the map includes highlighting, on the map, the physical location of the physical computing system associated with the virtual machine.

7. A computer program product for identifying a physical machine corresponding to a virtual machine, the computer program product comprising:

a computer readable memory device having computer usable program code embodied therewith, the computer usable program code comprising a computer usable program code configured to:

assign, in a database, a data center machine identifier to a physical computing system in a data center;

assign, in the database, a physical location within the data center for the physical computing system;

in response to creation of a virtual machine on the physical computing system, create a mapping from a virtual machine identifier assigned to the virtual machine to the data center machine identifier for the physical computing system, wherein the computer usable program code to create the mapping includes computer usable program code to map an internet protocol address for the virtual machine to the physical computing system;

in response to an occurrence of an event on the virtual machine, utilize the mapping to determine the physical location for the physical computing system associated with the virtual machine based, at least in part, on the data center machine identifier of the physical computing system in the data center;

display a map of at least a portion of the data center; and identify on the map the physical location for the physical computing system associated with the virtual machine.

8. The computer program product of claim 7, wherein the computer usable program code configured to assign, in the database, the data center machine identifier includes computer usable program code configured to receive one or more of a manufacturer brand, machine model, or machine serial number for the physical computing system.

9. The computer program product of claim 7, wherein the computer usable program code configured to assign, in the database, the physical location for the physical computing system includes computer usable program code configured to assign one or more of a column, a row, or a vertical address of the physical computing system in the data center.

10. The computer program product of claim 9, wherein the computer usable program code configured to assign, in the database, the physical location for the physical computing system includes computer usable program code configured to assign a location within a rack of physical computing systems.

11. The computer program product of claim 7, wherein the computer usable program code configured to create the mapping includes computer usable program code to:

obtain, by the virtual machine, the data center machine identifier for the physical computing system hosting the virtual machine; and associate in the database, by the virtual machine, the internet protocol address for the virtual machine with the data center machine identifier for the physical computing system hosting the virtual machine.

12. The computer program product of claim 7, wherein the computer usable program code configured to identify on the map includes computer usable program code configured to highlight, on the map, the physical location of the physical computing system associated with the virtual machine.

13. An apparatus comprising:

one or more processors; and a computer readable storage medium having computer usable program code for the one or more processors embodied therewith, the computer usable program code comprising a computer usable program code configured to:

assign, in a database, a data center machine identifier to a physical computing system in a data center;

assign, in the database, a physical location within the data center for the physical computing system; and in response to creation of a virtual machine on the physical computing system, create a mapping from a virtual machine identifier assigned to the virtual machine to the data center machine identifier for the physical computing system, wherein the computer usable program code to create the mapping includes computer usable program code to map an internet protocol address for the virtual machine to the physical computing system;

in response to an occurrence of an event on the virtual machine, utilize the mapping to determine the physical location for the physical computing system associated with the virtual machine based, at least in part, on the data center machine identifier of the physical computing system in the data center;

display a map of at least a portion of the data center; and identify on the map the physical location for the physical computing system associated with the virtual machine.

14. The apparatus of claim 13, wherein the computer usable program code configured to assign, in the database, the data center machine identifier includes computer usable program code configured to receive one or more of a manufacturer brand, machine model, or machine serial number for the physical computing system.

15. The apparatus of claim 13, wherein the computer usable program code configured to assign, in the database, the physical location for the physical computing system includes computer usable program code configured to assign one or more of a column, a row, or a vertical address of the physical computing system in the data center.

16. The apparatus of claim 13, wherein the computer usable program code configured to create the mapping includes computer usable program code to:

obtain, by the virtual machine, the data center machine identifier for the physical computing system hosting the virtual machine; and associate in the database, by the virtual machine, the internet protocol address for the virtual machine with the data center machine identifier for the physical computing system hosting the virtual machine.

17. The apparatus of claim 13, wherein the computer usable program code configured to identify on the map includes computer usable program code configured to highlight, on the map, the physical location of the physical computing system associated with the virtual machine.

* * * * *